Feb. 13, 1934.                S. POWELL                1,946,758
BRAKE
Filed Aug. 19, 1931
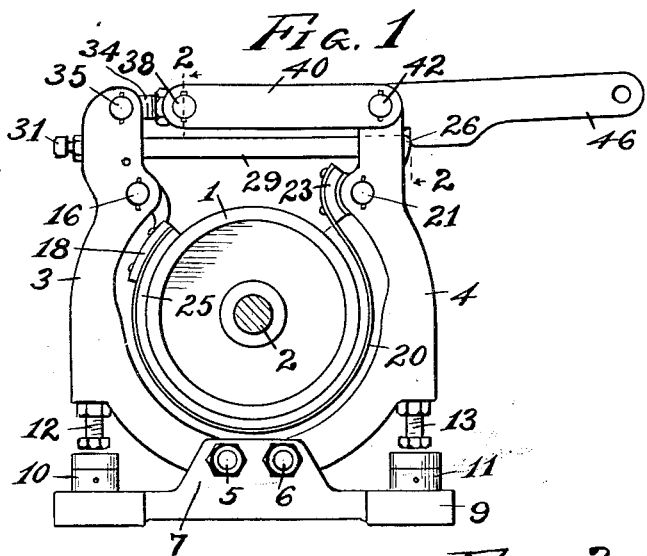
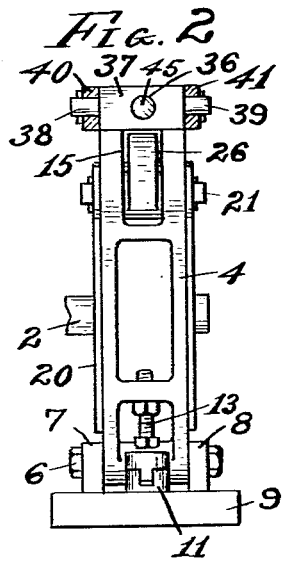
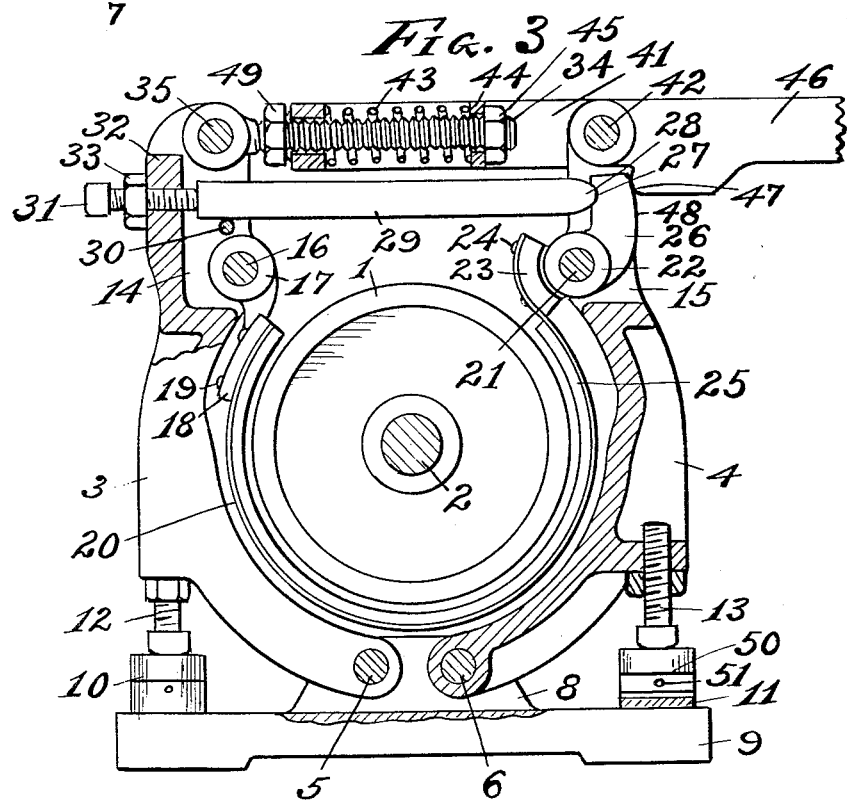
Inventor
*Stanley Powell*
By *G. E. Dunstan*,
*his* Attorney Patented Feb. 13, 1934

1,946,758

UNITED STATES PATENT OFFICE 1,946,758

BRAKE

Stanley Powell, East Cleveland, Ohio

Application August 19, 1931. Serial No. 558,012

7 Claims. (Cl. 188—166)

This invention relates to brakes and more particularly to band brakes for cranes, hoists, elevators and other machinery.

The main object of the invention is to provide a band brake, which is spring set and releasable by electromagnetic or other means by the expenditure of comparatively little energy.

Another object of the invention is to provide a band brake of said character, in which there is exerted both a pulling and a pressing action of the band upon the brake wheel when the brake is being set and a pushing and spreading action thereof when being released.

Another object of the invention is to provide a brake band of said character, which is readily adjusted and opened to clear the brake wheel when repairs are necessary.

With the above and other objects in view, the invention will be hereinafter fully described as illustrated in the accompanying drawing, and the novel features thereof will be distinctly pointed out in the appended claims.

In the drawing, similar characters of reference are used to indicate corresponding parts.

Figure 1 is a side elevation of a band brake constructed in accordance with my invention, the band being in engagement with the brake wheel, Fig. 2 is an end elevation of Fig. 1, the upper part thereof being in cross section taken on line 2—2, and Fig. 3 is a similar view to Fig. 1, on an enlarged scale, the brake band being out of engagement with the brake wheel, and certain parts of the mechanism being broken away to better show the construction.

Referring to the drawing, 1 represents a brake wheel fixed to a shaft 2 of the machine to be controlled by the brake. A pair of curved lever-arms 3 and 4 are pivoted at 5 and 6 to upright lugs 7 and 8 of a base 9, which is adapted to be bolted to any suitable support. Bosses 10 and 11 are formed integrally with the base 9, and adjusting screws 12 and 13 carried by the lever-arms 3 and 4 are adapted to engage said bosses for limiting the outward movements of said lever-arms. The upper ends of the lever-arms 3 and 4 are bifurcated as indicated at 14 and 15. Pivoted in the bifurcation 14 on a transverse pin 16 is the boss 17 of an anchor-plate 18, to which is fixed at 19, one end of a flat band 20 of spring steel. Pivoted in the bifurcation 15 on a pin 21 is a pull-member 22 having a circular face plate 23, to which the other end of the steel band 20 is fixed as indicated at 24. A suitable brake lining 25 is fixed to the inner side of the steel band 20 and is adapted to engage the brake wheel 1. The pull-member 22 has an upright arm 26, the forward edge of which is provided with a transverse recess 27 for receiving the rounding rear end 28 of a push-bar 29 having its forward end resting on a supporting pin 30 of the lever-arm 3. An adjusting screw 31 is threaded in a transverse portion 32 of the lever-arm 3, and its inner end engages the forward end of the push-bar 29. A lock-nut 33 holds the screw 31 in a set position.

For drawing together the lever-arms 3 and 4 to set the brake, an eye bolt 34 is pivoted to a transverse pin 35 of the lever-arm 3, and said bolt passes loosely through an opening 36 of a block 37 having end trunnions 38 and 39. Links 40 and 41 are pivoted on said trunnions and also on the outer ends of a pivot pin 42 of the lever-arm 4. A coiled spring 43 of suitable strength is arranged on the bolt 34 between the block 37 and a washer 44 held on said bolt by a nut 45 adapted to adjust the tension of said spring. For releasing the brake, a lever 46 is pivoted on the pin 42 in the bifurcation 15 of the lever-arm 4, and a suitable cam surface 47 thereof is adapted to engage the rounding outer edge 48 of the upright arm 26 of the pull-member 22. The lever 46 may be actuated manually or by any suitable means.

In order to provide for releasing the tension of the coiled spring 43 and permit convenient and quick disassembling of the brake mechanism, a nut 49 is provided on the eye bolt 34, and this nut may be set against the block 37 when the lever 46 has been pressed down. The bosses 10 and 11 are preferably split at 50 so that the upper parts thereof may be slidably removed to permit spreading apart of the lever-arms 3 and 4 when the pivot pin 42 has been removed. Cotter-pins at 51 are provided for removably securing the upper parts of the bosses 10 and 11 in position.

*Operation.*—The stop screws 12 and 13, the adjusting screw 31 and the tension adjusting nut 45 are set to give the desired action of the brake, and normally the lever 46 is slightly up and the lining 25 of the brake 20 is in engagement with the brake wheel 1 and the brake is set. Upon downward movement of the lever 46, its cam surface 47 acting against the rounding outer edge 48 at the upper part of the upright arm 26 of the pull-member 22 forces said arm inwardly thereby forcing the push-bar 29 to the left against the lever-arm 3. This action supports the lever-arms 3 and 4 against the contracting action of the coiled spring 43, and at the same time the downward rocking movement of the face plate 23 of the pull-member 22, releases the pull on the band 20. The separating action of the lever-arms 3 and 4, and also the downward rocking movement of the face plate 23 of the pull-member 22, cause the band 20 to move away from the brake wheel 1. There is both a moving away and also a longitudinal movement of the band 20 relative to the brake wheel. When the lever 46 is released, the tension of the coiled spring 43 draws together the upper ends of the lever-arms 3 and 4, the push-bar 29 forces the upright arm 26 of the pull-member 22 outwardly thereby rocking its face plate 23 upwardly and thus causing a pulling action on the band 20. The inner movement of the lever-arms 3 and 4 and also the upward rocking movement of the pull-member 22 cause both movement of the band 20 towards the brake wheel and also longitudinal movement of said band.

From the drawing and description, it is seen that this brake band is positive and quick in action, efficient, requries comparatively little energy to release, is convenient to adjust, and may be easily and quickly disassembled for repairs.

Although the mechanism illustrated and described is well adapted to accomplish the intended purpose, it will be understood that slight changes in the details of construction may be made within the scope of the claims.

Having fully described my invention, what I claim is:

1. In a brake, the combination with a brake wheel, of a flexible band adapted to engage the brake wheel, a pair of lever-arms, the band having one end connected to one of said lever-arms, a pull-member, the pull-member being movably supported by the other lever-arm, said band having its free end connected to said pull-member, means tending to draw together said lever-arms for moving said band towards said brake wheel and means for actuating said pull-member from the action of said lever-arms for causing a longitudinal movement of said band.

2. In a brake, the combination with a brake wheel, of a flexible band adapted to engage the brake wheel, a pair of lever-arms, the band having one end connected to one of said lever-arms, a pull-member, the pull-member being pivotally supported by the other lever-arm, the pull-member having an inwardly projecting end and an upright arm, said band having its free end connected to the inner end of said pull-member, a push-bar, the push-bar engaging said arm of said pull-member and the lever-arm to which said band is connected, and means tending to draw together said lever-arms.

3. In a brake, the combination with a brake wheel, of a flexible band adapted to engage the brake wheel, a pair of lever-arms, the band having one end connected to one of said lever-arms, a pull-member, the pull-member being pivotally supported by the other lever-arm, the pull-member having an inwardly projecting end and an upright arm, said band having its free end connected to the inner end of said pull-member, a push-bar, the push-bar engaging said arm of said pull-member and the lever-arm to which said band is connected, means tending to draw together said lever-arms, and means adapted to actuate said upright arm of said pull-member for forcing said lever-arms apart and drawing said band longitudinally.

4. In a brake, the combination with a brake wheel, of a flexible band adapted to engage the brake wheel, a pair of lever-arms, the band having one end connected to one of said lever-arms, a pull-member, the pull-member being pivotally supported by the other lever-arm, the pull-member having an inwardly projecting end and an upright arm, said band having its free end connected to the inner end of said pull-member, a push-bar, the push-bar engaging said arm of said pull-member and the lever-arm to which said band is connected, a lever pivoted to one of said lever-arms, and the lever having a cam adapted to engage the upright arm of said pull-member for actuating same.

5. In a brake, the combination with a brake wheel, of a flexible band adapted to engage the brake wheel, a pair of lever-arms, the band having one end connected to one of said lever-arms, a pull-member, the pull-member being pivotally supported by the other lever-arm, the pull-member having an inwardly projecting end and an upright arm, said band having its free end connected to the inner end of said pull-member, a push-bar, an adjusting screw carried by the lever-arm to which said band is connected, the push-bar engaging said arm of said pull-member and said adjusting screw, and means tending to draw together said lever-arms.

6. In a brake, the combination with a brake wheel, of a flexible band adapted to engage the brake wheel, a lefthand lever-arm, the flexible band having one end connected to the lefthand lever-arm, a righthand lever-arm, a pull-member, the pull-member being pivoted to the righthand lever-arm, the pull-member having an inwardly extending end, said flexible band having its free end connected to said inwardly extending end of said pull-member, means tending to draw together said lever-arms and actuate said pull-member in one direction, and means adapted to release said lever-arms from the action of said means tending to draw together said lever-arms.

7. In a brake, the combination with a brake wheel, of a flexible band adapted to engage the brake wheel, a lefthand lever-arm, the flexible band having one end connected to the lefthand lever-arm, a righthand lever-arm, a pull-member, the pull-member being pivoted to the righthand lever-arm, the pull-member having an inwardly extending end, said flexible band having its free end connected to said inwardly extending end of said pull-member, said pull-member having an upright arm, a push-bar, the push-bar engaging said upright arm of the pull-member and said lefthand lever-arm, an eye bolt pivoted to said lefthand lever-arm, a block, said eye bolt passing loosely through said block, links pivoted to said block and said righthand lever-arm, a nut on said eye bolt, a spring on said eye bolt between said block and said nut thereof for drawing together said lever-arms, a lever pivoted to said righthand lever-arm, and said lever having a cam adapted to engage said upright arm of said pull-member.

STANLEY POWELL.